UNITED STATES PATENT OFFICE 2,596,939

FIRE RETARDING COATING COMPOSITION COMPOSED OF A NITROGEN-PHOSPHORUS COMPOUND WITH AN ALDEHYDE RESIN AND POLYHYDROXY ALCOHOL

Morris L. Nielsen and Paul E. Marling, Dayton, Ohio, assignors to Monsanto Chemical Company, St. Louis, Mo., a corporation of Delaware No Drawing. Application December 30, 1948, Serial No. 68,408

4 Claims. (Cl. 260—29.4)

The present invention is directed to fire-retarding coatings and to a method of manufacture thereof.

It is an object of the invention to provide paints which may be utilized as surface coatings on wood and other combustible materials to render them resistant to fire.

It is another object to provide a novel method of manufacturing interior and exterior surface-protective coatings which are resistant against weather and wear as well as against fire.

It has been known in the art that certain inorganic phosphate salts have utility in the formulation of fire proofing compositions, but it has been a disadvantage of such inorganic salts that only a small proportion of the same could be incorporated into surface-protective coatings such as paints, since these phosphate salts resulted in the formation of rough coating films, from which the soluble salts could be readily removed by leaching with water.

It has now been found that fire-retarding compositions of great stability may be provided by the combination of poly-alcohol compounds, together with an aminoplast resin and a chemical component to furnish nitrogen and phosphorus. The nitrogen-phosphorus component is preferably the condensation product of ammonia and phosphoryl chloride. One type of such product is described by Mellor in Comprehensive Treatise on Inorganic and Theoretical Chemistry, 8, 713 (Longmans, Green and Company, New York, 1923).

A preferred compound obtainable from the reaction product of ammonia and phosphoryl chloride by heat-treatment thereof is the insoluble, infusible composition which may be designated as polyphosphorylamide. The preparation of the water-insoluble, substantially neutral polyphosphorylamide is described in copending application, Serial No. 68,402, filed December 30, 1948, which application is assigned to the same assignee as is the present application.

The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorusoxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of our process.

Preferably the heating step may be carried out upon the reaction product produced by the first step while the product is still suspended or mixed with the original hydrocarbon solvent. This results in better yields and simplified operation, since the material may be handled more easily and without losses. The second step of our process involves heating the product produced in the first step to a temperature above 155° C., but below a temperature of 250° C., either at atmospheric or superatmospheric pressure. During the heating period, a small amount of ammonia is evolved which may be recovered and reused in the process. During the eheating step the nitrogen-phosphorus product apparently undergoes a polymerization or molecular rearrangement, being converted thereby into a water-insoluble product of higher molecular weight.

*Example A*

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C. After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus. The nitrogen-phosphorus atomic ratio is approximately 1.80:1, but may be varied within the range of 1.5:1 to 2.0:1 by variation of the amount of $NH_3$ initially reacted with the $POCl_3$ and this product to some degree polymerized, and then subjected to heating as described above, to complete the polymerization.

The polyphosphorylamide is a white powder, insoluble in water, and having a substantially neutral or alkaline reaction. The nitrogen-phosphorus atomic ratio of the polymeric material lies in the range of 1.72:1 to 1.80:1, which represents a type of material which is most effective in releasing nitrogen or nitrogen compounds with production of a bulky char when exposed to heat in the presence of aminoplasts. As a result of the heat-induced reaction between the polyphosphorylamide and the nitrogenous resin, the coating composition intumesces or swells to provide a porous, puffy, adherent, insulating coating which protects the base surface of wood or other combustible, cellulosic material, such as straw, fabric and the like.

The nitrogen-containing resins contemplated in the present invention may be characterized as heat-reactive or thermosetting aminoplasts. Such materials are described by C. Ellis in Chemistry of Synthetic Resins, Chap. 26 (Reinhold Publishing Co., 1935) and by C. Nauth in Chemistry and Technology of Plastics, Chap. 3 (Reinhold Publishing Co., 1947). As is well known, aminoplasts are resins derived from amino (including imino) or amido (including imido) compounds, a typical example being the urea-formaldehyde resin (reference: Modern Plastics, 17, 433, 1939). Other aminoplasts which may be employed in the combination composition of the present invention are the formaldehyde condensation products with urea, melamine, thiourea, guanidine, cyanamide, dicyandiamide, and also the corresponding furfural condensation products in the same relationship. Such resinous compositions may employ high or low degrees of methylolation (or the corresponding furfural substitution) covering the entire range of substitution, such as from 1 to 6 methylol radicals per mole of the acceptor compound in the case of melamine. The use of the alkylated modifications of such resins is likewise contemplated, particularly in the butylated modifications, such as are conventional in urea-formaldehyde and melamine-formaldehyde resins.

In addition to the synthetic type of resins, as set forth above, it is also possible to utilize nitrogen-containing, resinous materials derived from natural protein sources, such as casein. The casein compositions insolubilized by reaction with formaldehyde are of particular utility for this purpose. Such resins, as may be brought into solution or dispersion for use in the present compositions, may also be introduced into the formulations of the present invention.

In the present embodiment of the invention as a water paint or emulsion, it is necessary for the obtainment of a binding effect that the resinous or resin-forming constituent be water-soluble. For this purpose the intermediate stage of the condensation product of the particular resin is employed. Upon application of the fire-retardant material comprising the nitrogen-containing resin or condensation product in combination with the polyhydric plasticizer and the reaction product of phosphoryl chloride and ammonia, the resin forms a continuous surface film in which the phosphorus compound is dispersed. In this form the combination composition is potentially available in the event of a fire, under which circumstances a chemical reaction takes place to release gases, thereby forming a heat-insulating and fire-retarding char by intumescence, which prevents the otherwise combustible base material from burning.

It has been found that an improvement may be effected in fire-retarding compositions based upon water-soluble, amino-plast resins and the above-described nitrogen-phosphorus compounds, by the combination therewith of one or more compounds characterized as polyhydroxy compounds. Examples of preferred types of suitable compounds are sorbitol, mannitol and pentaerythritol.

In the practical production of a film-forming composition which may be applied as an aqueous solution or suspension, it was discovered by the applicants that the water-soluble aminoplast condensation products, as described above, was improved by the use of an auxiliary material to prevent checking and to produce a level, uniform film of the resin and at the same time a stable dispersion of the phosphorus-containing compound. It has been found that the polyhydroxyl compounds of the class consisting of mannitol, sorbitol and pentaerythritol produce a level, check-free film, and also permit low temperature curing to occur with the formation of a water-insoluble, fire-retarding, potentially intumescent film.

The requirements set forth above have been found to be accomplished by the use as stated above of polyhydroxyl compounds, such as mannitol, sorbitol and pentaerythritol. In the prior art such chemical compounds have not been generally acceptable as plasticizers, since the free hydroxyl groups characteristic of these compounds apparently accelerate the decomposition of most resinous materials. It has been found, however, that in the present fire-retarding compositions, based upon a nitrogen-containing resin and a nitrogen-phosphorus compound derived from phosphoryl chloride and ammonia, that these polyhydroxyl compounds serve not only to stabilize the final, applied film, particularly during the initial curing period after the water has evaporated, but also assist in the production of a stable, aqueous dispersion. While the present invention is not predicated upon any particular hypothesis, it appears that some combination is formed in the coating film whereby improved adherence and retention is obtained with respect to the polyhydric compound bound chemically to the reaction product of ammonia and phosphoryl chloride.

In accordance with this invention, a paint formulation is provided in the form of a water dispersion rather than a complete solution, so that the coating composition thus made will dry and harden rapidly, and will be insoluble after drying. More specifically, fire-retarding paint and coating compositions may be formulated with the following additional components:

1. Polyphosphorylamide or other reaction products of ammonia and phosphoryl chloride: 5% to 50% by weight based upon the weight of solids.
2. An aminoplast resin. The aminoplast may be used in the range of 1 to 4 parts by weight of resin to one part of the polyphosphorylamide, a preferred range being 2 to 3 parts for one part of polyphosphorylamide.
3. A polyhydroxyl compound as a plasticizer, used to the extent of 1% to 10% by weight of the aminoplast resin.

In addition to the above essential constituents, ancillary materials which may be used according to the present invention include:

1. Suitable pigments to provide a range of colors, and to provide covering power necessary in producing a suitable product, may be employed.
2. Dispersing agents to stabilize the water emulsions. Alkyl aryl sulfonates such as Santomerse may be employed. Emulsions may also be formed by the use of water-soluble, alkyd condensation products, such as are described in copending application Serial No. 51,296, filed September 25, 1948, now abandoned, assigned to the same assignee as is the present application.
3. Additional fire-retarding agents, such as chlorinated paraffins, ammonium phosphate, chlorinated biphenyls, such as the Aroclors, etc.

The polyphosphorylamide as an essential constituent of the above compositions may be employed in the concentration range of 5% to 50% of the coating composition. Relatively large proportions of polyphosphorylamide are readily included in the formulation since this material also increases the covering power of the coating composition. This material is preferably employed as a fine powder to secure a uniform film which is insoluble upon drying. The polyhydroxy compound may be utilized in proportions of 1% to 10%, based upon the weight of the nitrogen-containing resin.

The paint composition utilizing the polyphosphorylamide as set forth above is a self-extinguishing coating composition which offers protection against fire when the paint has been applied to or impregnated into wood or other cellulosic materials, such as fiber board, paper, cloth, and the like. The coating composition may also be applied to protect other combustible materials, such as rubber and leather.

Illustrative of the generic character of the invention, but not limitative of the scope thereof, the following examples illustrate particular embodiments of the present invention.

Example 1

A water-soluble condensation product, together with the water-insoluble dispersion of polyphosphorylamide, may be made from the following ingredients:

| | Grams |
|---|---|
| Urea-formaldehyde condensation product | 25 |
| Mannitol | 16 |
| Polyphosphorylamide | 8 |
| Titanium dioxide | 4 |
| Water | 45 |

The above composition, when applied to test panels of wood, gave a film of good covering power, free of checking, and acceptable fire-retarding qualities. When subjected to a test flame, as described in American Paint Journal Convention Daily, November 6, 1946, the coated panel charred and intumesced at the point of contact of the flame. The frothy, porous, heat-insulating char which was thus formed by contact with a flame, protected the base wood surface from combustion.

The above composition also shows good adhesion to metal surfaces. For such applications to metal, the resinous film which is produced provides a composition which will not flash when subjected to heat and hence will not propagate a flame, but on the contrary, will insulate the underlying material by providing a porous overlayer which does not burn, and which prevents the spread of fire.

Example 2

| | Parts |
|---|---|
| Polyphosphorylamide | 15 |
| Urea-formaldehyde (water-soluble condensation product) | 37 |
| Titanium dioxide | 6 |
| Mannitol | 21 |
| Water | 52 |

The above composition was found to yield a flame-resistant film which adhered very well to a base such as wood, to give a tough, flexible film as a result of the mannitol contained therein.

Example 3

| | Parts |
|---|---|
| Polyphosphorylamide | 10 |
| Titanium dioxide | 4 |
| Urea-formaldehyde (water-soluble condensation product) | 25 |
| Resorcinol | 10 |
| Paraformaldehyde | 8 |
| Pentaerythritol | 10 |
| Water | 36 |

The above formulation was tested and found to resist the propagation of a flame. The coating film, after drying, was a smooth, tough, adherent film, which did not check under weathering conditions.

Example 4

The plasticizing effect of sorbitol is illustrated in the present example:

| | Grams |
|---|---|
| Urea-formaldehyde (water soluble) | 25 |
| Sorbitol | 16 |
| Polyphosphorylamide | 8 |
| Titanium dioxide | 4 |
| Water | 45 |

The above composition, dispersed as a water paint, was shown to be a useful, fire-retarding material when tested on wood panels which were subjected to standard, fire-retarding tests. The coating film was tough and wear-resistant.

*Example 5*

The plasticizing effect of pentaerythritol is shown in the present example:

|   | Grams |
|---|---|
| Urea-formaldehyde (water soluble) | 25 |
| Pentaerythritol | 16 |
| Polyphosphorylamide | 8 |
| Titanium dioxide | 4 |
| Water | 45 |

The above formulation was shown to be a fire-retarding composition when applied to test panels of wood in the standard fire-retarding tests.

In the utilization of pentaerythritol as a plasticizer, this material may be provided in the mono-, di-, or polypentaerythritol form. Mixtures of these, and technical grades thereof, may also be used.

The improved, fire-retarding compositions of the present invention provide a superior film to the product formulated without the polyhydroxyl plasticizer. The resinous film which is obtained utilizing the polyhydroxyl plasticizers is a smooth surface characterized by a semi-gloss appearance. The resinous film, when once applied to a surface, cures rapidly at room temperature, after which immersion in water does not deleteriously affect the fire-retarding properties. The resinous coating film which is obtained is quite hard, tough, and shows good adhesion on metallic and wooden surfaces. However, the coating composition may be applied to any combustible or non-combustible materials, which it is desired to protect against combustion or against the propagation of flame or fire. The polyhydric plasticizers of the present invention also prevent the formation of checks or cracks in the resinous coating.

This application contains subject matter in common with certain other applications assigned to the same assignee as is the present application:

Serial No. 68,402, filed December 30, 1948, relating to the water-insoluble composition of matter resulting from the reaction of phosphoryl chloride and ammonia;

Serial No. 68,403, filed December 30, 1948, relating to a water paint comprising a dispersion of the water-insoluble reaction product of phosphoryl chloride and ammonia in combination with water-soluble, nitrogen-containing resinous materials;

Serial No. 68,404, filed December 30, 1948, relating to a flameproofing treatment for cotton by the application thereto of the water-insoluble reaction product of phosphoryl oxychloride and ammonia;

Serial No. 68,405, filed December 30, 1948, relating to compositions comprising phenol-formaldehyde resins in combination with the water-insoluble reaction product of phosphoryl chloride and ammonia;

Serial No. 68,406, filed December 30, 1948, relating to intumescing compositions comprising the combination of a nitrogen-containing resin in combination with the water-insoluble reaction product of phosphoryl chloride and ammonia;

Serial No. 68,407, filed December 30, 1948, relating to water paints based upon the combination of the water-insoluble reaction product of phosphoryl chloride and ammonia together with water-soluble alkyd resins derived from the reaction of citric acid and glycerine;

Serial No. 68,409, filed December 30, 1948, relating to a coating composition comprising an organic solvent containing organic, film-forming resins in combination with the water-insoluble reaction product of phosphoryl chloride and ammonia;

Serial No. 68,410, filed December 30, 1948, relating to the combination of the water-insoluble reaction product of phosphoryl chloride and ammonia together with chlorinated rubber;

Serial No. 68,411, filed December 30, 1948, relating to flameproofed cloth having deposited thereon the combination of the water-insoluble reaction product of phosphoryl chloride and ammonia together with antimony oxide and polyvinyl chloride;

Serial No. 136,135, filed December 30, 1949, relating to glowproofing compositions comprising the combination of the reaction product of phosphoryl chloride and ammonia together with antimony oxide and chlorinated paraffins;

Serial No. 136,136, filed December 30, 1949, relating to compositions comprising the combination of the reaction product of phosphoryl chloride and ammonia together with compounds having free hydroxy radicals such as pentaerythritol.

It will be obvious to those skilled in the art that changes in the formulae may be made without departing from the spirit and scope of the invention. The above embodiments of the invention are merely suggestive and exemplary, it being understood that the applicant's are entitled to protection on all such uses and formulations where the compositions produced are new. The invention is not to be limited to the specific compositions herein-described, or specifically covered by the claims.

What is claimed and desired to be protected by Letters Patent of the United States is:

1. A fire-retarding coating composition consisting of a dispersion of water, the water-insoluble reaction product of phosphoryl chloride and anhydrous ammonia, said water-insoluble product having a nitrogen/phosphorus ratio between 1.72:1 and 1.80:1, a resin selected from the group consisting of amine-aldehyde and amide-aldehyde resins, and as a plasticizer therefor a polyhydroxyl compound of the group consisting of mannitol, sorbitol and pentaerythritol, which plasticizer is present in said fire-retarding composition to the extent of from 1% to 10% by weight based upon the weight of the said aldehyde resin.

2. A fire-retarding coating composition consisting of a dispersion of water, the water-insoluble reaction product of phosphoryl chloride and anhydrous ammonia, said water-insoluble product having a nitrogen/phosphorus ratio between 1.72:1 and 1.80:1, a resin selected from the group consisting of amine-aldehyde and amide-aldehyde resins, together with mannitol as a plasticizer, said mannitol being present in the said composition to the extent of from 1% to 10% by weight based upon the weight of the said resin.

3. A fire-retarding coating composition consisting of a dispersion of water, the water-insoluble reaction product of phosphoryl chloride and anhydrous ammonia, said water-insoluble product having a nitrogen/phosphorus ratio between 1.72:1 and 1.80:1, a resin selected from the group consisting of amine-aldehyde and amide-aldehyde resins, together with sorbitol as a plasticizer, said sorbitol being present to the extent of from 1% to 10% by weight based upon the weight of the said resin.

4. A fire-retarding coating composition consisting of a dispersion of water, the water-insoluble reaction product of phosphoryl chloride and anhydrous ammonia, said water-insoluble product having a nitrogen/phosphorus ratio between 1.72:1 and 1.80:1, a resin selected from the group consisting of amine-aldehyde and amide-aldehyde resins, together with pentaerythritol as a plasticizer, said pentaerythritol being present to the extent of from 1% to 10% by weight based upon the weight of the said aldehyde resin.

MORRIS L. NIELSEN.
PAUL E. MARLING.

REFERENCES CITED

The following references are of record in the file of this patent:

UNITED STATES PATENTS

| Number | Name | Date |
|---|---|---|
| 2,052,886 | Leroy | Sept. 1, 1936 |
| 2,163,085 | Cupery | June 20, 1939 |
| 2,197,357 | Widmer | Apr. 16, 1940 |
| 2,413,163 | Bacon | Dec. 24, 1946 |

FOREIGN PATENTS

| Number | Country | Date |
|---|---|---|
| 181,547 | Switzerland | Mar. 16, 1936 |

OTHER REFERENCES

Mellor: Comprehensive Treatise on Inorganic and Theoretical Chemistry, vol. 8 (1928); pages 704–720.